May 18, 1943.   F. L. SIMMONS   2,319,270
PERMANENT MAGNET CHUCK
Filed July 12, 1940   4 Sheets-Sheet 1

Inventor
Frank L. Simmons

Clayton R. Jenks
Attorney

Witness
Herbert E. Coveu

May 18, 1943. F. L. SIMMONS 2,319,270
PERMANENT MAGNET CHUCK
Filed July 12, 1940 4 Sheets-Sheet 2

Inventor
Frank L. Simmons
By Clayton R. Jenks
Attorney

Witness
Herbert E. Covey

May 18, 1943.  F. L. SIMMONS  2,319,270
PERMANENT MAGNET CHUCK
Filed July 12, 1940   4 Sheets-Sheet 3

Witness
Herbert E. Covey

Inventor
Frank L. Simmons
Clayton D. Jenks
Attorney

May 18, 1943.    F. L. SIMMONS    2,319,270
PERMANENT MAGNET CHUCK
Filed July 12, 1940    4 Sheets-Sheet 4

Inventor
Frank L. Simmons
By Clayton P. Jenks
Attorney

Witness
Herbert E. Bovey

Patented May 18, 1943

2,319,270

UNITED STATES PATENT OFFICE 2,319,270

PERMANENT MAGNET CHUCK

Frank L. Simmons, Woonsocket, R. I.

Application July 12, 1940, Serial No. 345,189

12 Claims. (Cl. 175—367)

This invention relates to permanent magnet chucks, and more particularly to chucks of the type shown in my prior U. S. Patent No. 2,286,238 dated June 16, 1942, wherein one or a plurality of permanent magnets may be so arranged relatively to the pole pieces of a work plate that a work piece may be held thereon or the magnetic lines of flux may be cut and the poles of the magnets isolated from both sets of pole pieces to permit ready removal of the work therefrom.

In constructions of this type, there are two primary arrangements. In one, a single magnet, or a plurality of magnets arranged in parallel and acting as a single magnet, has one polar face adjacent one set of pole pieces of the work plate and the other face at the bottom of the chuck casing connected through a return circuit, such as the casing walls, to the other set of pole pieces. In the other type, a plurality of magnets have their upper poles arranged alternately north and south adjacent to the pole pieces of the work plate and magnetically connectable thereto and their other poles are also magnetically connectable to provide a magnetic circuit. Provision is made for moving the magnet, or an associated slide plate, relatively to the pole pieces so that one or both of the magnet pole faces may be either connected magnetically with the work plate pole pieces or isolated therefrom. There is, however, some leakage of flux and a resultant magnetism in the pole pieces of the work plate even when the associated magnet pole is isolated therefrom, so that this leakage flux magnetism tends to make it somewhat difficult to remove the work from the chuck.

The primary object of this invention is to provide a permanent magnet construction in which the magnets may have one or both of their pole faces connected with or entirely isolated from the work plate pole pieces and wherein the pole pieces in that isolated condition may be magnetically connected to provide a path for the leakage flux so that the work piece may be very easily removed therefrom. Further objects will be apparent in the following disclosure.

In accordance with my invention, I have provided a permanent magnet chuck of the above type with a slide which is so constructed and arranged that it may be moved from an ineffective position to one where it will serve to connect magnetically the two sets of pole pieces of the work supporting plate so as to shunt the leakage flux away from the work. During the normal operation of the chuck, this slide lies in an inoperative position: but when the chuck is to remain unused for any length of time, the magnets and slide may be so located and arranged that the slide constitutes a keeper for the magnets and thus minimizes the loss of magnetism thereof.

Referring to the drawings which illustrate the preferred embodiments of this invention.

Figure 1:
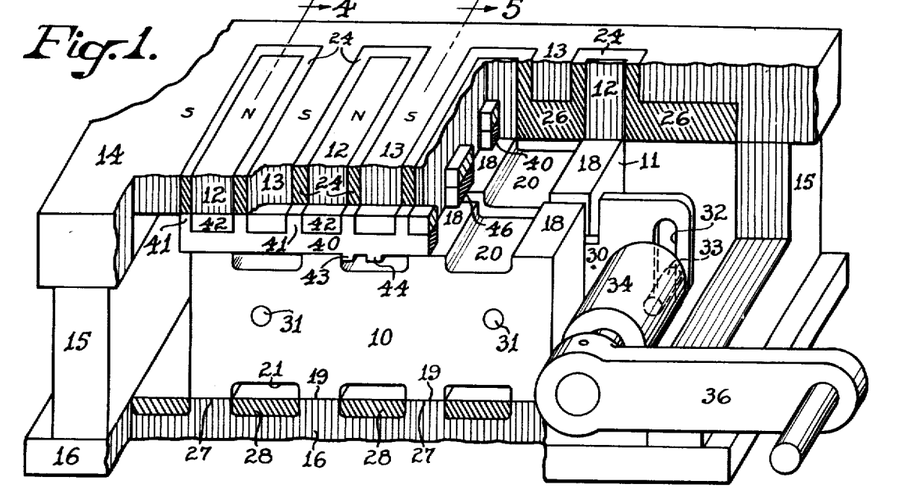
Fig. 1 is a fragmentary isometric view, partly in section, of one type of magnetic chuck, containing such a slide, in which a permanent magnet is so arranged that one pole face communicates directly with one set of pole pieces while the other magnet pole and the chuck casing form a circuit with the other set of pole pieces, the parts being shown in the operative position of magnetizing the work plate.

In the construction shown in Figs. 1 to 6 inclusive two permanent magnets 10 and 11 are so mounted in parallelism as to serve as a single magnet, but one or any desired number of magnets may be used. The combination magnet is slidably mounted in a chuck casing in such an arrangement that it may be in magnetic circuit with the work and its supporting work plate pole pieces or both poles of the magnet may be isolated from the associated pole pieces. The magnet poles of opposite polarity are arranged to be connected with the north and south pole pieces 12 and 13 of the work supporting plate 14. This plate 14, the side walls 15 and the bottom plate 16 are made of soft iron or other suitable magnetic material and form the chuck casing. While the magnet may be variously shaped and the associated parts of the chuck arranged to cooperate therewith, it is preferred that the magnet be made as shown in Fig. 1, which comprises a plurality of spaced polar ridges 18 at the top of the magnet and spaced ridges 19 at the bottom which provide spaced plane polar faces separated by recesses 20 and 21. Although it may be differently constructed, the work plate 14 in the form illustrated is made of a single piece of soft iron shaped to provide a set of spaced pole strips 13 separated by parallel slots. The iron pole pieces 12 are located within these slots and they are suitably brazed in place and insulated magnetically from the plate 14 by brass or Babbitt metal 24. Hence the entire top plate 14 with its spaced cross bars 13 may serve as the south pole and the inserts 12 as the north pole of the work plate, or vice versa.

As shown at the right hand portion of Fig. 1, each spaced polar ridge 18 has substantially the same width as the associated north pole insert 12, and the parts are provided with plane faces and are so shaped and arranged that they slidably engage for the purpose of conducting magnetism directly from the magnet to the north pole pieces. The under side of the plate 14 is cut away so that the south pole cross bars 13 are not as thick vertically as are the inserts 12, and the space beneath these bars 13 is filled with non-magnetic material, such as Babbitt metal 23, which thus underlies and isolates the south pole cross bars from the top of each magnet. Since the pole pieces 12 and 13 are substantially the same width, then this Babbitt metal 26, which is a continuation of the non-magnetic material 24 surrounding the pole pieces 12, forms a wide surface of such extent that when the magnets 10 and 11 are moved to the left to the positions of Fig. 2, the spaced polar ridges 18 will lie wholly under these Babbitt portions and be entirely isolated from both of the pole pieces of the work plate.

Figure 2:
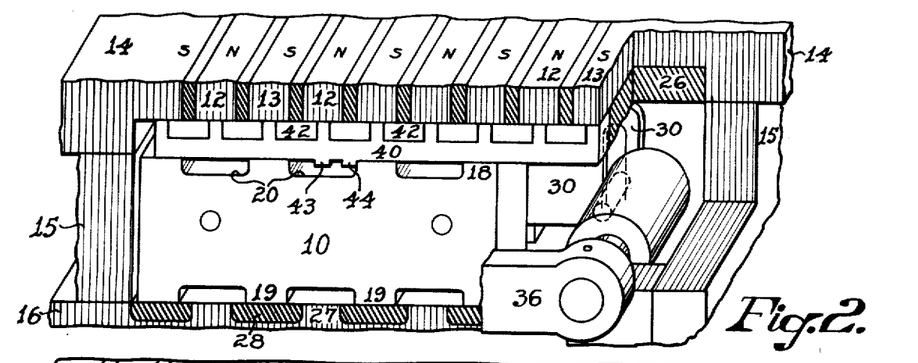
Fig. 2 is a similar fragmentary view showing the magnet moved to a position of isolation and wherein the two sets of pole pieces of the work plate are magnetically connected by the slide.
Figure 3:
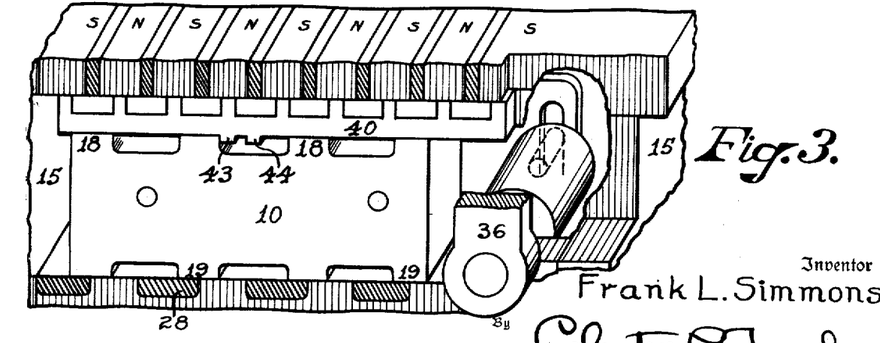
Fig. 3 is a similar view in which the parts are so arranged that the slide serves as a keeper for the magnets during their non-use.

The same construction may be utilized at the bottom of the chuck. That is, the bottom south polar ridges 19 are separated by gaps 21. Beneath these gaps in the position of Fig. 1, the bottom iron plate 16 is cut away to provide spaced ridges 27 separated by deep parallel cuts, and these cuts are filled with Babbitt metal 28. Hence, the spaced plane faced polar ridges 19 of the magnet may be in direct contact with the spaced plane faced ridges 27 of the bottom plate 16 which lie between the inserts 28, as shown in Fig. 1, or the magnet polar faces 19 may be moved to contact only with the Babbitt metal 28 as shown in Fig. 2. Thus, it will be seen that when the magnet unit is moved to the position of Fig. 2, both of its polar faces are completely isolated from the iron pole pieces of the work plate. Brass plates 29 or air gaps serve to isolate the sides of the magnets from the iron sides 15 of the casing.

The two magnets 10 and 11, or more if desired, are connected to a central brass plate 30 by means of brass pins 31 (Fig. 1) passing therethrough. The plate 30 has an elongated vertical slot 32 in its right hand end, and this slot is adapted to carry a pin 33 which is eccentrically mounted on the end of a rotatable member 34. The latter is suitably mounted on a side wall 15 for rotation by means of a handle 36 secured thereto and projecting at the outside of the casing. Power mechanism may also be utilized, as set forth in my prior application, for the purpose of moving the magnets. When the handle 36 is in the right hand position of Fig. 1, the magnet polar faces 18 and 19 are in circuit with the north and south pole pieces of the work plate. When the handle 36 is moved through an arc of 180° to the position of Fig. 2, the magnet unit is inoperative and isolated from both sets of pole pieces of the work plate. Various constructional features may be included to facilitate this operation, and the dimensions and shapes of the various parts will be made such as to insure that the magnets may be readily moved.

When the magnets are isolated from the work plate, there may be enough leakage flux in the work plate pole pieces 12 and 13 to interfere with the removal of the work. The primary purpose of the present invention is to provide means for magnetically connecting the two sets of north and south pole pieces of the work plate during the time when the magnets are isolated therefrom, as shown in Fig. 2. While many types of construction may be employed for this purpose, I prefer to use a slide 40 (Fig. 6) made of brass or other non-magnetic material, which has upstanding parallel ridges 41. Between these ridges are located small blocks 42 of soft iron or other magnetic material. The tops of the ridges 41 and blocks 42 lie in one plane and the plane faced bottom of the slide is also shaped and arranged to slide along the tops of the magnet ridges or spaced polar faces 18 in grooves provided for the purpose. This slide plate also has downwardly projecting lugs 43 and 44 spaced apart and located in one of the recesses 20 between two of the polar ridges 18 of the magnet. The lugs are arranged to be struck by the side faces of the ridges 18 when the magnet is moved, but lost motion is provided so that the magnet may move about halfway before moving the slide 40.

Figure 4:
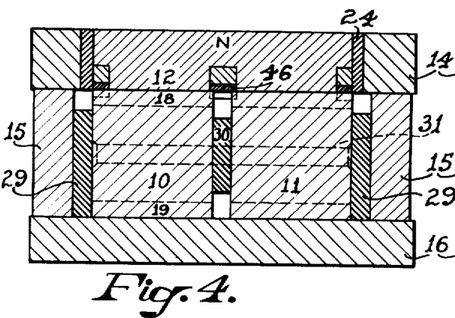
Fig. 4 is a transverse section taken on the line 4 of Fig. 1 looking in the direction of the arrow.
Figure 5:
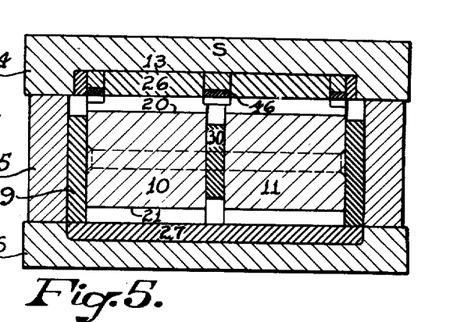
Fig. 5 is a similar view on the line 5 of Fig. 1.

The ribs 41 of the slide 40 are of the same width as the non-magnetic material 24 between the long side faces of the north pole pieces 12 of the work plate, and the iron blocks 42 inserted between these ribs 41 are of the same width as the south and north pole pieces 12 and 13 of the work plate. Hence each iron block 42 may slidably contact with the underside of one of the pole pieces 12 or 13 (Fig. 1) or it may be moved to straddle the intervening Babbitt metal 24 and contact with two adjacent pole pieces 12 and 13 and so connect them magnetically, as shown in Fig. 2. These slides may be quite narrow since small blocks 42 will serve the purpose of carrying the leakage flux. A slide plate may be mounted at each side of the casing near the outer edges of the magnets but located wholly above the magnets within grooves formed in the Babbitt 26 and the north pole pieces 12. A central slide 46 may be of extra width and arranged to span the gap over the spacer bar 30 and contact with each of the magnets 10 and 11, as shown in Figs. 1, 4 and 5. Each slide is shorter than its slideway, and the lugs 43 and 44 and other parts are so located and arranged that the slide may be moved by the magnet to a position where each block 42 lies wholly under a pole piece or bridges two adjacent pole pieces.

When the chuck is to be used, the magnet unit is moved to the "on" position of Fig. 1 and so carries each slide to a position where the iron inserts 42 contact only with the overlying pole pieces and so are ineffective. When the work is to be released the handle 36 is moved to the left to isolate the magnets from the pole pieces. This causes the lug 44 to be struck and to carry the slide to the left where each block 42 contacts with two adjacent pole pieces 12 and 13 and bridges the gap therebetween. This is accomplished by the time that the polar faces of the magnets have reached their "off" positions. Thus the magnet is isolated from the pole pieces and each block 42 connects the adjacent pole pieces and so permits easy removal of the work piece therefrom. As a result, the blocks 42 connect all of the pole pieces 12 and 13 together into a single unit and form a shunting path for the leakage flux in the work plate pole pieces. That is the blocks 42 and pole pieces form a shortened shunt circuit for the leakage flux which would otherwise go through the work, while the main portion of the flux is entirely cut off. When the chuck is to remain idle, the handle 36 is moved from the work releasing position of Fig. 2 to the vertical position of Fig. 3. The slide remains in the "off" position of Fig. 2 but the magnet poles 18 and 19 now contact partially with the pole pieces 12 and associated flux conducting parts of the chuck bottom 16. Since the slides now interconnect the north and south pole pieces of the work plate, the parts provide a complete circuit for the magnetic lines of flux, and thus the slides serve as keepers for the magnet.

This invention applies to other types of permanent magnets, such as those shown in my prior application, wherein only one of the magnet poles may be isolated from its associated work pieces. Also, the shunting slide may be employed in a type of chuck in which two or more magnets are mounted in reverse polarity arrangement, in which one magnet forms a return path for the flux emanating from another. In the forms shown in Figs. 7 to 17 inclusive, the chuck comprises three magnets so arranged that the two outer ones form a return path for the flux from the central magnet, but it will be understood that one, two or any larger number of magnets may be used in a suitable shape and arrangement to form the magnetic unit.

The construction illustrated in Figs. 7 to 17 comprises a central magnet 50 and two outer magnets 52 which are so arranged that the top pole of the magnet 50 connects directly with one set of pole pieces in the work plate while the top poles of the two outer magnets 52 likewise connect directly with the other set of work plate pole pieces. The magnets are preferably shaped as described with reference to Fig. 1, so as to provide spaced polar ridges 54 and 55 at the top and the bottom respectively of the central magnet 50, while the two outer magnets have the spaced polar ridges 56 and 57 at their tops and bottoms. Each of these ridges has its polar faces formed as flat or plane surfaces. The recesses 58 between the polar ridges 54 of the central magnet and the recesses 59 between the polar ridges 56 of the outer magnets are made wider than are the polar faces in order to provide for the isolation of the poles and the work plate as above described. The bottom faces of the three magnets may be placed in magnetic contact with the iron bottom plate 60 of the chuck so that the three magnets form essentially a double U construction when in operation but which may be isolated from each other at both poles when the work is to be released.

Figure 7:
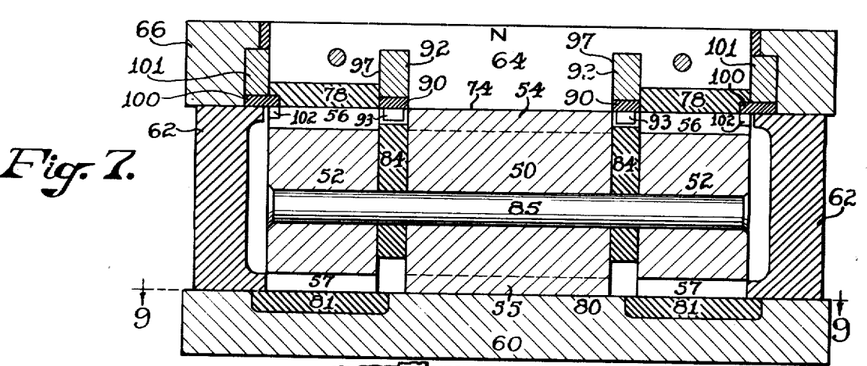
Fig. 7 is a sectional view of a modification having three magnets of alternately arranged polarity assembled in a chuck having a non-magnetic frame for the work plate.
Figures 8, 11, 12, 15, 16, 17:
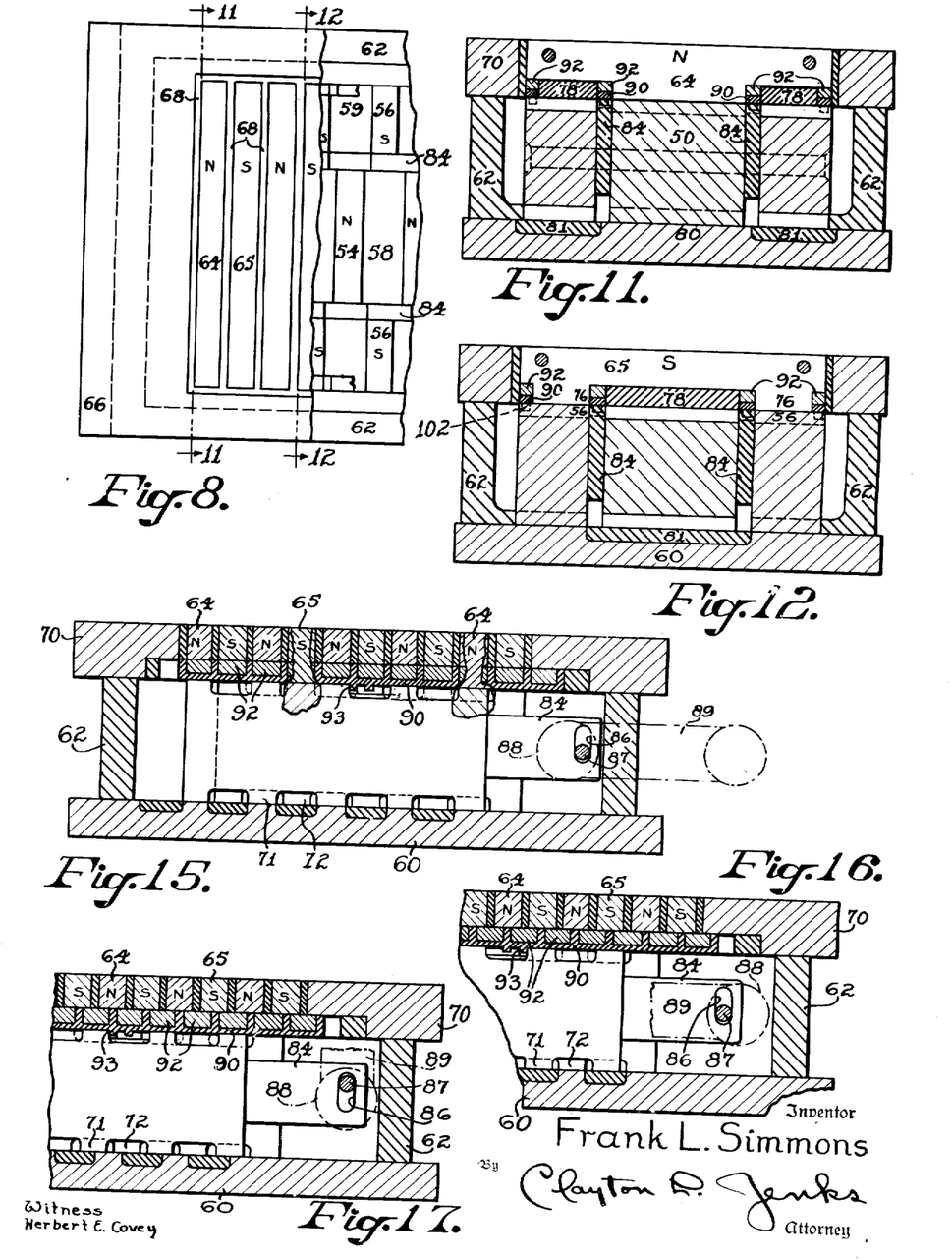
Fig. 8 is a fragmentary top plan view, partly broken away, of the modified form of Fig. 7 showing both the work plate and the tops of the magnets.
Fig. 11 is a transverse sectional view corresponding with Fig. 7 showing the north pole piece of the work plate mounted in an iron frame.
Fig. 12 is a similar view showing the south pole piece.
Fig. 15 is a longitudinal sectional view of the chuck showing the positions of the parts for holding the work.
Fig. 16 is a similar view with the parts in an "off" or non-holding position.
Fig. 17 is a similar view showing the slide positioned as a keeper for the magnets.

The side wall 62 of the chuck may be made of aluminum, brass or the like so as to completely isolate the bottom poles of the magnets from the top work plate. The work plate pole pieces 64 and 65, in the form shown in Figs. 7 and 8, are carried by a non-magnetic frame 66 made preferably of aluminum or brass. This frame is cut away in its central portion above the magnets and the pole inserts 64 and 65 are suitably brazed or otherwise secured in that opening in a spaced relationship as shown in Fig. 8. These pole inserts are separated by Babbitt metal 68 or other suitable material that isolates the pole pieces from one another. Alternatively, the frame as indicated at 70 in Fig. 15 may be made of iron similar to that shown in Fig. 1, wherein the frame has spaced slots cut therein so that one set of pole pieces, such as the south poles, are formed of the spaced ribs which are integral with the outer rim forming the work plate frame.

Figures 9, 10, 13:
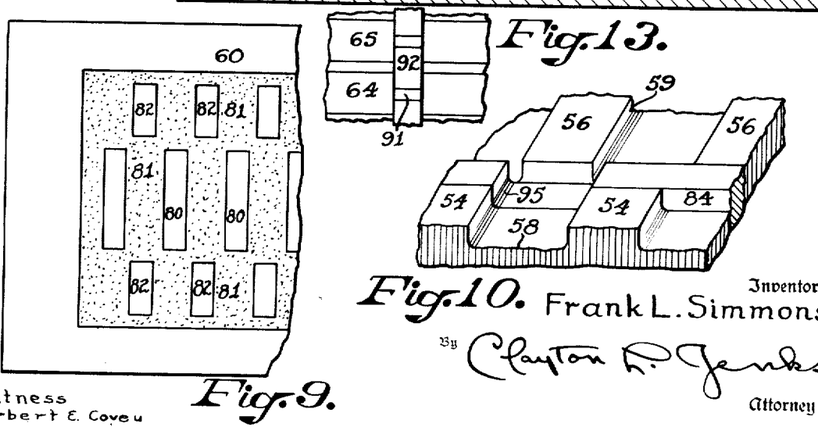
Fig. 9 is a fragmentary sectional view of the base plate taken on the line 9—9 of Fig. 7.
Fig. 10 is an isometric detail showing portions of the tops of two adjacent magnets and the non-magnetic brass separator.
Fig. 13 is a fragmentary sectional detail of a slide and associated pole pieces as shown in Fig. 12.

The north pole pieces 64 of the work plate are made T-shaped, as shown particularly in Figs. 7 and 11, and the lower face 74 of the central portion of each insert makes magnetic contact with one of the flat polar faces of the top ribs 54 of the central magnet. Thus, these spaced pole pieces form an extension of the magnet and constitute the north pole thereof. Similarly, the south pole pieces 65, whether the inserts of Fig. 12 or the cross bars shaped as in the construction of Fig. 1, are U-shaped and the downwardly extending spaced legs 76 (Fig. 12) contact with the top south polar faces 56 of the two outside magnets, and these extensions thus form the south pole pieces of the magnets. Babbitt metal 78 is filled into the spaces beneath the outer portions of the north pole pieces and into the spaces between the legs 76 of the south pole pieces. Similarly, at the bottom of the chuck, the iron plate 60 is cut away to provide the upstanding spaced polar ribs 80 and 82 separated by spaces filled with Babbitt metal 81, as shown in Fig. 9.

When the magnets are in their operative positions, the bottom polar faces 55 of the central magnet contact with the polar ridges 80 of the bottom plate and the bottom polar ridges 57 of the two outer magnets contact with the upstanding ridges 82 of the bottom plate. But when the magnets are moved to their inoperative positions, these bottom faces of the magnets contact only with the Babbitt metal 81 in this bottom plate. The same arrangement is to be found on the under side of the work plate and F'g. 9 may be considered also as a view looking up at the under side of that plate except as that view would be modified by the presence of the slides to be described. Hence, the lines of force passing upwardly through the central magnet and into the north pole pieces 64 will go through the work and then down through the south pole pieces 65 and into the two outer magnets 52 and thence to the iron plate at the bottom of the chuck forming the return path of the circuit.

In order to permit the magnet unit to be moved bodily relative to the pole pieces and to make the chuck either inoperative or operative, the three magnets are connected together with brass or other non-magnetic spacers 84, and the parts are pinned together by brass pins 85, as shown in Fig. 7. Each slide plate 84 has an extension at one end provided with a vertical slot 86 carrying the pin 87 (Fig. 15) mounted eccentrically on a rotary member 88 and which is operated by a handle 89 as above described with reference to Fig. 1. The casing is made of such size internally that the magnets may be moved bodily lengthwise to positions where the north and south pole faces of the magnet contact with their respective pole pieces or lie wholly in contact with the Babbitt metal between the pole pieces.

Figure 6:
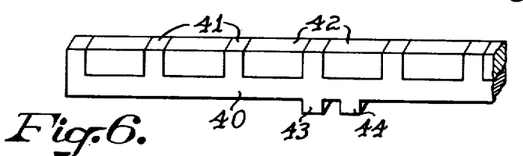
Fig. 6 is an isometric fragmentary detail of the slide of Fig. 1.

The primary feature of this invention, as above explained, resides in the provision of one or more slides or equivalent construction which will serve to connect magnetically the pole pieces of the work plate. For the 3-magnet chuck, I preferably provide four slides, although one is sufficient for the purpose. In the construction shown in Fig. 7, in which the outer frame of the work plate 66 is made of aluminum, the two central slides may be shaped as shown in Fig. 6. The brass strips 90 have spaced upstanding ribs 91 between which are placed the iron blocks 92 and on the under side are the two depending lugs 93. These brass strips 90 ride on the smooth plane tops of the brass spacer plates 84 which lie in the plane of the tops of the polar faces. The lugs 93 depend into a cut-out portion 95 (Fig. 10) in each of the spacer plates 84, the lugs being so shaped and arranged that they will be struck by the cut out walls 95 when the magnets and the spacer strips are moved endwise. As shown in Fig. 7, the north pole pieces are provided with slots 97 having smooth surfaces adapted to contact with the sides of the iron blocks 92 of the slide. The sides of the legs of the south pole pieces contact with the blocks. Each of the blocks 92, which are the same length as the width of the pole pieces, will contact at its side with only one pole piece when the chuck is in use, or each will overlap two pole pieces and magnetically connect them when the work is to be removed, as shown in the fragmentary detail of Fig. 13.

Figure 14:
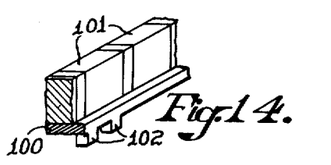
Fig. 14 is an isometric detail of an end slide of Fig. 7.
Figure 18:
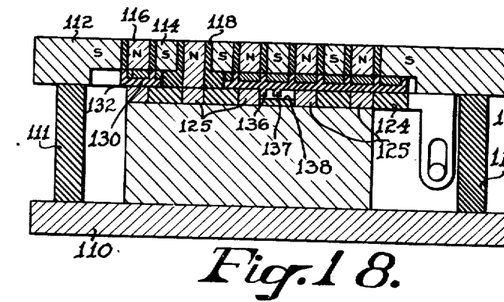
Fig. 18 is a longitudinal section of a modified form in which the magnets are stationary and a slide plate is employed to isolate the magnets from the pole pieces.

The side slides may be similarly constructed, but as shown particularly in Figs. 7 and 14, the brass slides 100 which carry the iron blocks 101 ride on the tops of the aluminum side walls 62. The frame and associated parts are cut away to permit movement of the slide. The slide 100 overhangs the wall 62 and has a pair of narrow depending lugs 102 which project into the space between two upstanding south pole ridges 56 of the outer magnet. It will thus be seen that the iron blocks 101 of these end slides also contact with the vertical end faces of the north and south pole pieces 64 and 65.

It will be observed that the central magnet is about twice as wide as the two outer magnets, so that the number of lines of force issuing from the central north pole will be approximately the same as those which may pass downwardly through the outside south poles, thus providing an even distribution of flux and providing a path of uniform area through the magnets. In this arrangement of pole pieces the flux will travel to both ends of the T-shaped north pole pieces and be distributed over the entire surface of each pole piece just the same as is the flux from the two south pole pieces, thus providing a satisfactory distribution of the flux.

In the above described constructions, the magnets are moved beneath the pole pieces, but it will be appreciated that this motion is merely relative and that the polar faces or pole pieces or portions or extensions of the magnets may be moved relatively to a stationary magnet unit. This is preferably accomplished by providing a supplemental slide plate between the magnets and the work supporting pole pieces. This construction, as shown in Figs. 18 to 22 inclusive, comprises a casing having an iron bottom 110, aluminum side walls 111 and a work plate having an iron rim 112, shaped as shown in Fig. 1, to provide cross bars 114 forming the south polar pieces separated by slots within which are mounted the north polar pieces 116 and insulated therefrom by Babbitt metal 118 or the like. A plurality of magnets 120 and 122 are mounted in the casing and may be arranged in the manner described above with reference to Fig. 7. These magnets may, however, be provided with flat top and bottom surfaces which make magnetic contact with the bottom plate 110. The tops of these magnets are also flat and lie in the same plane so that they will make magnetic contact with a slide 124 arranged thereabove and provided for isolating the magnets from the pole pieces.

Figure 19:
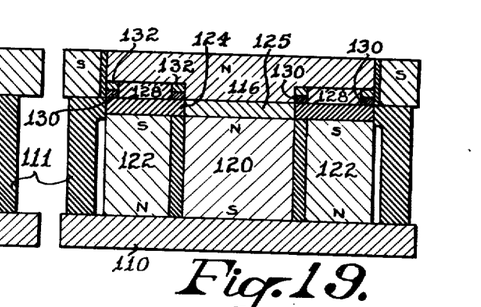
Fig. 19 is a transverse section of the same showing a north pole piece.

The slide 124 may be made as a rectangular brass frame having soft iron inserts 125 shaped and arranged to underlie and contact with the pole pieces of the work plate and to overlie and contact with the magnets and thus form their upper polar faces when the chuck is to be used. The north pole pieces 116, as shown in Fig. 19, are T-shaped, and the south pole pieces 114 (Fig. 20) are U-shaped and arranged as described above with reference to the constructions of Figs. 7 to 17. The iron inserts 125 in the slide 124 are, therefore, so spaced and arranged as to contact with the under surfaces of the pole pieces 114 and 116 when the chuck is "on" and the brass portions of the slide 124 between the iron inserts 125 are made wider than the corresponding pole pieces and are arranged so that, when the slide is moved to the left to the position of Fig. 21, only the brass portions of the side 124 will contact with the pole pieces. Babbitt metal 128 which is placed beneath the outer extending arms of the north pole pieces and within the U of the south pole pieces is likewise wider than the iron inserts 125 of the slide, so that the inserts 125 will contact only with that Babbitt metal when the slide is at the left and the chuck is to be inoperative. This slide may be moved by manual or power mecahnism, as above described, and various other constructional details may be used as desired by one skilled in the art.

Figure 20:
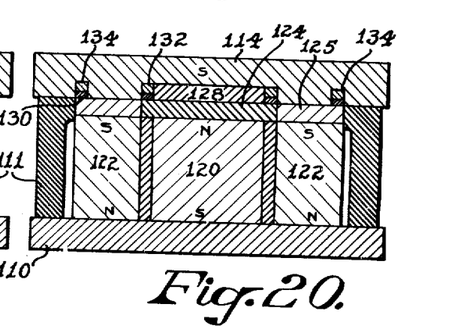
Fig. 20 is a similar view showing a south pole piece.
Figure 21:
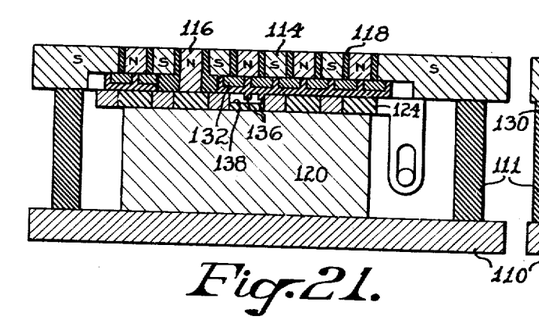
Figs. 21 and 22 are views similar to Fig. 18 showing the parts in an "off" position and a "keeper" position respectively.
Figure 22:
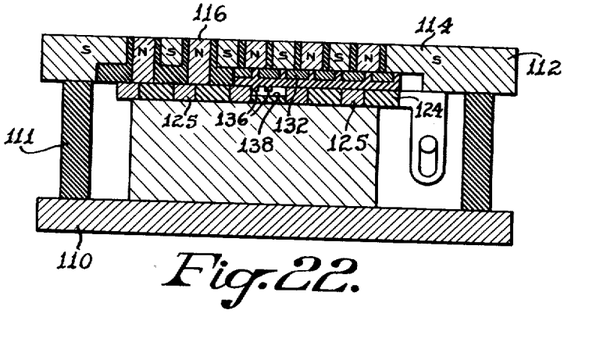

The primary feature of the present invention lies in providing this type of chuck with a supplemental slide which may be used to shunt away from the work the leakage magnetism in the pole pieces. This construction comprises a set of brass slide plates 130, which may be constructed substantially as shown in Fig. 6. The iron inserts 132 carried by these brass slides 130 are arranged to contact with the under sides of the north and south pole pieces. The two inner slide members 130 (Fig. 19) are mounted in grooves cut into the Babbitt metal 128, and the top and side of each alternate iron insert 132 contact with the side and under side of the U-shaped portion of a south pole piece 114 (Fig. 20). This south pole piece is also cut out to provide slots 134 (Fig. 20) within which ride the two outer slide members. Each of the slides 130 has depending lugs 136 (Figs. 21 and 22) riding in a slot 138 cut in the brass slide 124. These lugs and the end walls of the slot are so constructed and arranged that when the slide plate 124 is moved to the position of Fig. 21 to isolate the iron inserts 125 of the circuit breaking slide from the associated pole pieces of the work plate 112, then the supplemental slides 130 will be so positioned that their iron blocks 132 will overlap and connect the adjacent north and south pole pieces and thus form a shunt path for the leakage flux. The supplemental slide may be used as a keeper by positioning the parts as shown in Fig. 22. In that case the iron inserts 125 of the lower slide lie partly in contact with the adjacent north and south pole pieces, and the supplemental slide 130 is likewise so positioned that its iron blocks 132 also contact with the adjacent north and south pole pieces, thus forming a complete circuit. This top slide plate may be considered either as a part of the pole piece of the work plate or as a part of the permanent magnet unit, since the spaced iron blocks form a part of the magnetic circuit. The magnet and the iron blocks of the slides together with the pole pieces form a single magnet unit when in the operative positions. Hence the claims are to be interpreted as covering equivalent constructions wherein either a part of the magnet or a part of the work plate pole piece is moved.

The operation of these various constructions has been fully explained above and need be repeated only briefly with reference to Figs. 15, 16 and 17. When the handle 89 is in the right hand position of Fig. 15, the north and south polar faces of the magnet unit are in magnetic circuit with the work, as shown in the broken away portions. At that time, the slide plates have been moved to the positions shown in Fig. 15 by the depending lugs 93 and 102 contacting with the left hand ends of the slots in the adjacent separators 84 and of the recesses 56 respectively. Each iron block of the slides is in full magnetic contact with only one pole piece, and the blocks are therefore parts of the normal magnetic circuit. When the handle 89 is moved to the left (Fig. 16) the magnets are positioned with their polar faces contacting only with Babbitt metal, and these polar faces are completely isolated from the associated pole pieces of the work plate and no magnetic flux can escape to the work except the leakage magnetism. That leakage flux is provided with a shunt path by the slides being moved into position where each one of the iron block inserts contacts with the adjacent north and south pole pieces of the work plate, as shown in Figs. 13 and 16. When the chuck is not to be used, the slides may serve as keepers by moving the magnets back to a halfway position, as shown in Fig. 17, where their terminal polar faces are in part contact with their respective pole pieces; but the slides have not been moved, because of the lost motion provided, and their iron inserts remain in contact with both the north and the south pole pieces. Hence, the lines of force are provided with a complete circuit. Each one of the constructions illustrated in the drawings is such that both poles of the magnet unit may be completely isolated from the work plate and any leakage magnetism that escapes through the air gaps and the non-magnetic metal to the pole pieces may be largely shunted from the work. Thus, the work may be very easily removed from the work plate without injury to its surface and without any considerable effort on the part of the operator.

It will be appreciated that many other constructional features may be incorporated in the chuck as desired and that many modifications may be made in its construction within the knowledge of one skilled in the art and in the light of the above disclosure. The above disclosure is, therefore, to be considered as illustrating the general principles of this invention and my preferred embodiments and not as limitations upon the claims appended hereto.

I claim:

1. A chuck comprising a work plate having alternately arranged isolated pole pieces, a permanent magnet unit having spaced polar faces, means for moving the magnet unit for magnetically connecting said polar faces with or isolating them from the associated pole pieces, a slide having spaced magnetic members shaped and arranged to be moved into and out of contact with adjacent pole pieces and means providing a lost motion connection between the magnet unit and said slide whereby movement of the magnet unit to a position of isolation from the pole pieces causes said slide to magnetically connect the pole pieces.

2. A magnetic chuck comprising a work supporting plate having two sets of alternately arranged, isolated pole pieces of opposite polarity, a permanent magnet, means whereby the magnet may be connected in magnetic circuit with the associated pole pieces or alternatively the magnetic circuit may be broken, and a movably mounted shunting device separate from the magnet which has magnetic material arranged for movement to engage and connect work plate pole pieces of opposite polarity at points apart from their work engaging face portions when said circuit is broken, or alternatively to disconnect the same.

3. A magnetic chuck comprising a work plate having alternately arranged and magnetically separated pole pieces of opposite polarity, a permanent magnet, means whereby the poles of the magnet may be connected in magnetic circuit with said pole pieces or alternatively a magnet pole may be disconnected from its associated pole pieces to break the circuit and a movably mounted shunting device separate from the magnet which has a magnetic member arranged to be moved to contact with and magnetically connect pole pieces of opposite polarity at a point remote from the work engaging face portions or alternatively to be moved to disconnect the same; said parts being so arranged that the shunting device may connect the pole pieces when the circuit between the magnet and associated pole pieces is either made or broken.

4. A magnetic chuck comprising a work plate having alternately arranged spaced pole pieces having lower exposed faces, a permanent magnet having polar faces, means for moving a polar face of the magnet to connect it magnetically with its associated pole pieces or alternatively to isolate it therefrom and break the circuit, and a separate shunting device beneath the work plate mounted for sliding relative to both magnet and work plate pole pieces which has magnetic material arranged to be moved to a position where it contacts with the lower faces of adjacent pole pieces of opposite polarity and magnetically connects them when said circuit is broken or alternatively to be moved to disconnect the same.

5. A magnetic chuck comprising a work plate having alternately arranged, spaced, work supporting pole pieces having two sets of lower contact surfaces, a permanent magnet terminating in spaced polar faces which are movable to contact with one of said sets of contact surfaces or alternatively to be isolated therefrom, and a separate magnetic shunting device mounted beneath said surfaces and movable relatively to said faces and surfaces into engagement with contact surfaces of both sets so as to connect them or alternatively to disconnect the same.

6. A magnetic chuck comprising a work plate having alternately arranged, spaced, work supporting pole pieces, a plurality of permanent magnets terminating in spaced polar faces magnetically contacting with associated pole pieces, means whereby the polar faces may be moved to positions where they are isolated from the pole pieces, and a shunting device separate from the magnets which has magnetic material mounted for movement relative to said polar faces and pole pieces into and away from contact with adjacent pole pieces at points spaced from their work supporting face portions for magnetically connecting the pole pieces of opposite polarity when said polar faces are isolated therefrom or for alternatively disconnecting the same.

7. A magnetic chuck comprising a work plate having alternately arranged, magnetically separated pole pieces, a permanent magnet having polar faces of opposite polarity, means whereby a polar face may be moved to connect it with its associated pole pieces or alternatively moved to break the magnetic circuit with a work piece on said plate, a shunting device separate from the magnet having magnetic material arranged to be moved to contact with and magnetically connect pole pieces of opposite polarity at points spaced from their work supporting surface portions when said circuit is broken or alternatively to be moved to disconnect the same, and means whereby the shunting device may be moved to and from its operative position by movement of the magnet polar face.

8. A magnetic chuck comprising a work plate having alternately arranged, spaced pole pieces providing work supporting faces and separate contact faces, a permanent magnet having spaced polar faces forming one pole thereof, means whereby said polar faces may magnetically contact with associated pole pieces and a magnetic circuit may be formed with a work piece of alternatively said polar faces may be isolated from their associated pole pieces and the circuit broken, a movable shunting device separate from the magnet which has spaced elements of magnetic metal, each of said elements being movable to contact operatively with the two contact faces of adjacent pole pieces of opposite polarity and connect the same or alternatively to contact only with one pole piece, and means for moving said device.

9. A magnetic chuck comprising a work plate formed of alternately arranged spaced, work supporting pole pieces having two sets of contact faces apart from their work supporting portions, a permanent magnet, means whereby the magnet may be connected in magnetic circuit with the associated pole pieces or alternatively the magnetic circuit may be broken, a separate slidable shunting device having spaced magnetic parts arranged to contact with said sets of contact faces, each part being movable to engage a contact face of only one polarity and maintain the pole pieces disconnected or alternatively to engage contact faces of opposite polarity and magnetically connect the pole pieces, and means for moving the slidable shunting device to connect said pole pieces when said magnetic circuit is either made or broken.

10. A magnetic chuck comprising a work plate having two sets of alternately arranged, spaced, work supporting pole pieces, each set thereof having lower contact faces, a permanent magnet terminating in spaced polar faces movable to engage one set of said contact faces or alternatively to be isolated therefrom, a separate slide plate beneath said contact faces having magnetic material mounted for movement relative to the polar faces to contact simultaneously with both sets of contact faces and connect the same or alternatively to disconnect them, and means for moving said polar faces and slide plate to make and break the magnetic circuit and to connect the pole pieces when the circuit between the magnet and associated pole pieces is either made or broken.

11. A magnetic chuck comprising a work supporting plate having two sets of alternately arranged, isolated pole pieces of opposite polarity, a permanent magnet terminating in spaced polar faces, means whereby the magnet polar faces may be connected in magnetic circuit with the associated pole pieces or alternatively isolated therefrom so that the magnetic circuit may be broken, and a movably mounted shunting slide plate separate from the magnet which has spaced blocks of magnetic metal shaped and arranged for movement to engage and connect work plate pole pieces of opposite polarity at points apart from their work engaging face portions when said circuit is broken, or alternatively to disconnect the same.

12. A magnetic chuck comprising a work plate having alternately arranged, magnetically separated pole pieces, a permanent magnet having polar faces of opposite polarity, means for moving the magnet and connecting said polar faces with their associated pole pieces or alternatively disconnecting said faces and pole pieces to break the magnetic circuit with a work piece on said plate, a shunting slide separate from the magnet which has spaced magnetic members arranged to be moved to contact with and magnetically connect pole pieces of opposite polarity at points spaced from their work supporting surface portions when said circuit is broken or alternatively to be moved to disconnect the same, and means whereby movement of the magnet moves the shunting slide to and from its operative position so that the shunting slide connects the pole pieces when said magnetic circuit is broken.

FRANK L. SIMMONS.

CERTIFICATE OF CORRECTION.

Patent No. 2,319,270.

May 18, 1943.

FRANK L. SIMMONS.

It is hereby certified that error appears in the printed specification of the above numbered patent requiring correction as follows: Page 1, first column, line 5, and page 4, second column, line 12, for "relatively" read --relative--; page 6, first column, line 63, claim 8, for "piece of" read --piece or--; and that the said Letters Patent should be read with this correction therein that the same may conform to the record of the case in the Patent Office.

Signed and sealed this 29th day of June, A. D. 1943.

(Seal)

Henry Van Arsdale,
Acting Commissioner of Patents.